C. A. BENDER.
ROTARY ENGINE.
APPLICATION FILED SEPT. 21, 1910.
976,539.
Patented Nov. 22, 1910.
2 SHEETS—SHEET 1.
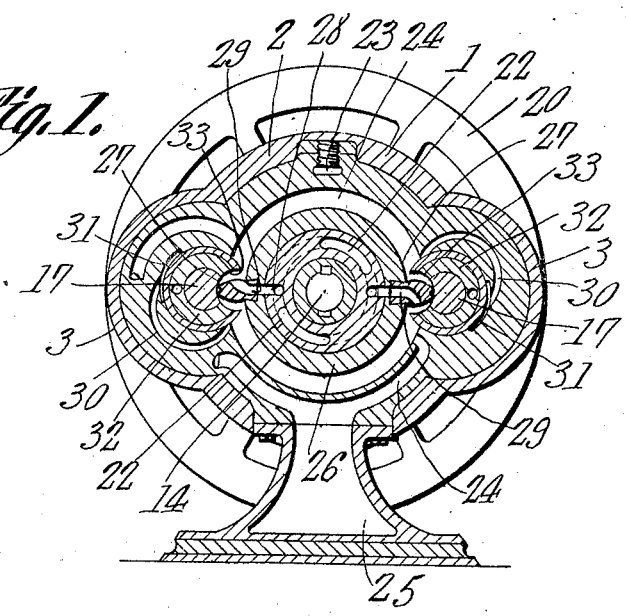
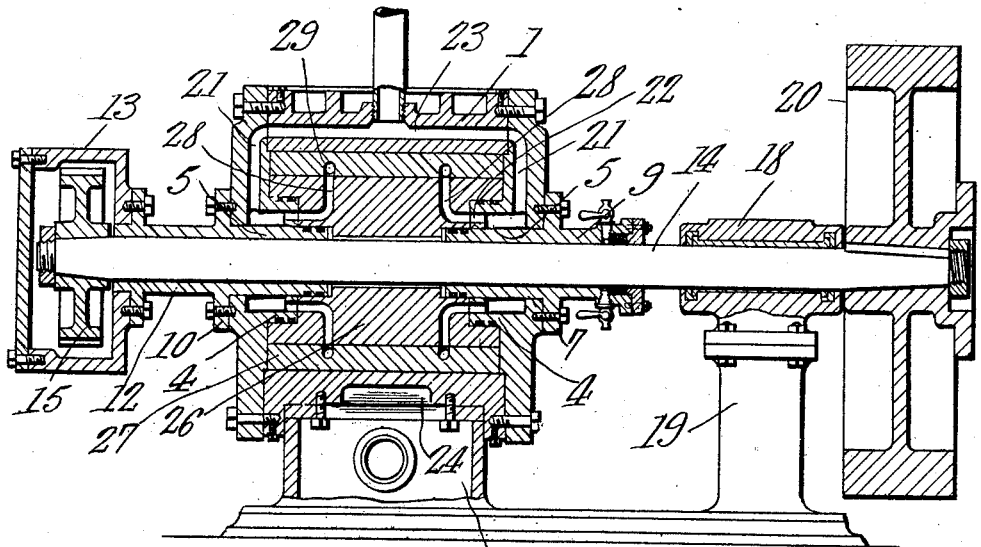
Witnesses
Charles A. Bender, Inventor
by C. A. Snow & Co.
Attorneys

C. A. BENDER.
ROTARY ENGINE.
APPLICATION FILED SEPT. 21, 1910.

976,539.

Patented Nov. 22, 1910.

2 SHEETS—SHEET 2.

Witnesses

Charles A. Bender,
Inventor by C. A. Snow & Co.
Attorneys

UNITED STATES PATENT OFFICE.

CHARLES ANDREW BENDER, OF HARRISBURG, PENNSYLVANIA.

ROTARY ENGINE.

976,539.  Specification of Letters Patent. Patented Nov. 22, 1910.

Application filed September 21, 1910. Serial No. 583,080.

*To all whom it may concern:*

Be it known that I, CHARLES A. BENDER, a citizen of the United States, residing at Harrisburg, in the county of Dauphin and State of Pennsylvania, have invented a new and useful Rotary Engine, of which the following is a specification.

This invention relates to rotary engines and consists in the novel construction and arrangement of its parts as hereinafter shown and described.

The object of the invention is to provide a rotary engine in which is employed a rotor through which the steam or other fluid pressure element is admitted in such manner as to balance the rotor upon its supporting shaft. A series of rolling abutments are provided to operate in conjunction with the said rotor and means are also provided for subjecting the said rolling abutments to steam pressure in order that they may be properly balanced upon their supporting shafts. The rotor and abutments are located in a suitable casing which in turn is provided with inlet and exhaust ports.

Figure 3:
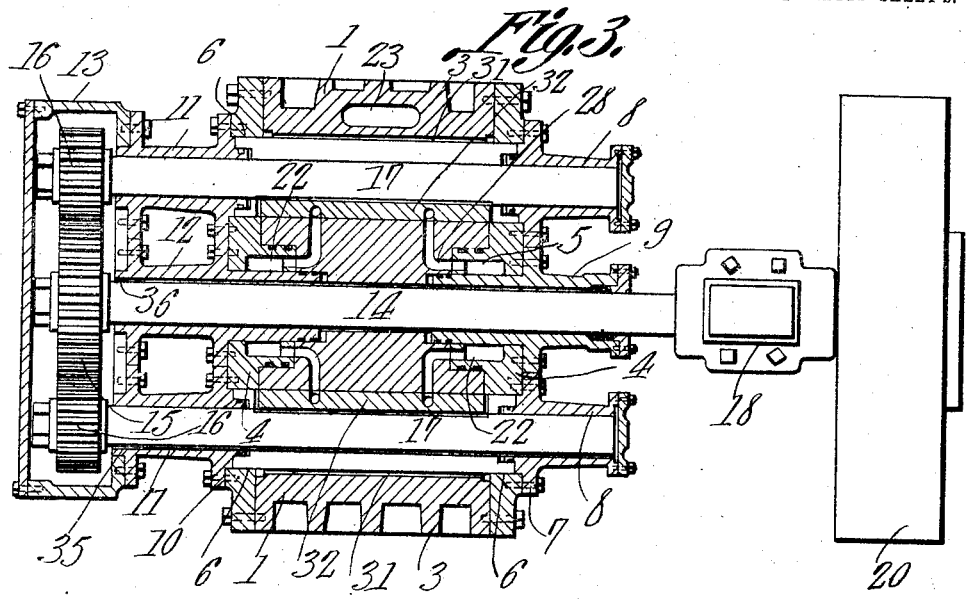
Figure 4:
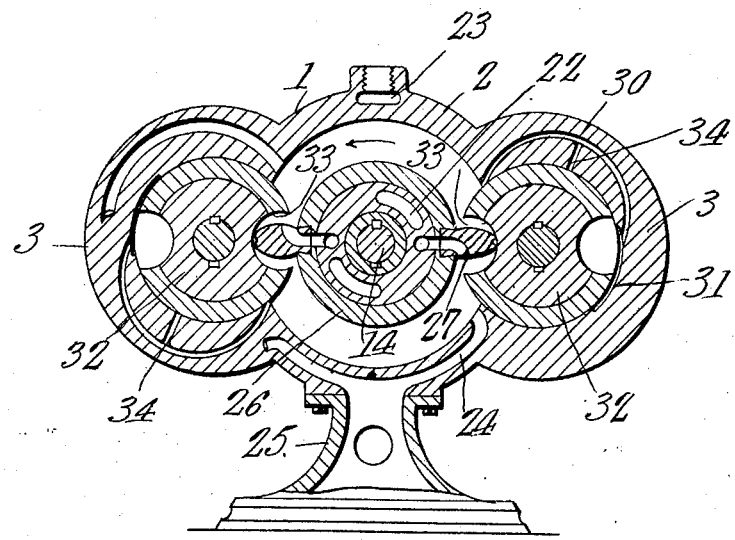

In the accompanying drawings—Figure 1 is a transverse sectional view of the rotary engine. Fig. 2 is a longitudinal sectional view of the same. Fig. 3 is a horizontal sectional view of the same. Fig. 4 is a transverse sectional view of a modified form of the rotary engine.

The casing 1 of the engine includes a central cylindrical portion 2 and side cylindrical portions 3. The portions 2 and 3 are bored throughout their length in the usual manner and are faced up at their ends so that their end surfaces are at true right angles to the axis through the bores of the said portions. Head plates 4 are applied to the ends of the casing 1 and are provided with bearings 5 which project into the ends of the bore through the intermediate cylindrical portion 2 of the casing and the said head plates are also provided with openings 6 which register with the ends of the bores through the cylindrical portions 3 of the casing 1. A plate 7 is applied to the outer side of one of the plates 6 and is provided with bearings 8 which are in alinement with the bores of the side cylindrical portion 3 of the casing 1 and a bearing 9 which is in alinement with the axis of the bores through the intermediate cylindrical portion 2 of the casing 1. The inner end portion of the bearing 9 projects through the bearing 5 provided in the adjacent plate 6 as illustrated in Figs. 2 and 3 of the drawings. A casting 10 is applied to the outer surface of the other plate 6 and the said casting 10 is provided with bearings 11 which correspond with the bearings 8 provided upon the plate 7 and the said casting 10 is also provided with a bearing 12 which corresponds with the bearing 9 provided upon the plate 7. A gear chamber 13 is attached to the outer end portion of the casting 10. A rotor shaft 14 is journaled in the bearings 9 and 12 and is provided at one end with a gear wheel 15 which meshes with gear wheels 16 which in turn are fixed to the ends of abutment shafts 17.

The abutment shafts 17 are journaled in the bearings 8 and 11 of the plate 7 and casting 10 respectively, and the intermeshing gear wheels 15 and 16 are housed within the gear chamber 13 attached to the outer end of the casting 10. The portion of the rotor shaft 14 opposite that end at which the gear wheel 15 is located projects to some extent beyond the end of the bearing 9 and is received in a bearing 18 which is located at the upper end of a standard 19. A combined fly and pulley wheel 20 is fixed to the end of the rotor shaft 14 beyond the outer end of the bearing 18.

The plates 6 are provided with steam passages 21 which circumscribe the bearings 9 and 12 and which are provided with outlets 22 located at the inner faces of the bearings 5. The said outlets 22 are in arcuate form as illustrated in Fig. 1 of the drawings and extend concentrically with relation to the axis of the rotor shaft 14. The intermediate cylindrical portion 2 of the casing 1 is provided with a steam inlet port or passage 23 and communicates at its ends with the steam passages 21 in the plates 6. The intermediate portion 2 of the casing 1 is also provided with outlet or exhaust ports 24 which communicate at their inner ends with the cylindrical bore through the said intermediate portion of the casing 1 in the vicinity of the side cylindrical portions 3 thereof and the said exhaust or outlet ports 24 also communicate with the interior of a supporting base 25 upon which the engine structure is mounted.

A rotor 26 is keyed upon the intermediate portion of the rotor shaft 14 and is located within the cylindrical bore of the intermediate portion 2 of the casing 1 with its periphery spaced from the inner surface of the said cylindrical portion. The said rotor is also located between the plates 6, 6 attached to the ends of the casing 1 of the engine. The rotor 26 at its ends is counterbored to receive the inner projecting end portions of the bearings 5, 9 and 12 as illustrated in Fig. 3 of the drawings. Wings 27 are fixed to the diametrically opposite sides of the rotor 26 and the outer ends of the said wings 27 are adapted to fit snugly against the inner surface of the cylindrical portion 2 of the casing 1 during the rotation of the rotor 26. The rotor 26 is provided with steam passages 28 the inner ends of which are adapted to register at times with the arcuate steam outlets 22 of the steam passages 21 in the plates 6. The outer ends of the passages 28 communicate with the inner ends of passages 29 provided in the wings 27 and the said passages 29 in turn have their outlets in the sides of the wings 27 opposite the sides from the direction in which the rotor 26 rotates when the engine is in operation. It will be seen that the steam passages 28 do not extend longitudinally along the entire length of the rotor 26 but the said steam passages are located at the opposite end portions of the said rotor and consequently when they receive steam the opposite end portions of the said rotor are subjected to the equal steam pressure and therefore the rotor is balanced longitudinally in its position upon the rotor shaft 14.

Steam passages 30 communicate at their inner ends with the interior of the cylindrical portion 2 of the casing 1 and at their outer ends are continued into recesses 31 which are located in the bores of the side cylindrical portions 3 of the casing 1 and traverse the length of the said bores. The object of the said passages 30 and recesses 31 is to admit steam against the outer portions of roller abutments (to be described) and thus force the said abutments toward the rotor 26 and counteract the steam pressure which is exerted against the said roller abutments from within the intermediate cylindrical portion 2 of the casing 1. The roller abutments 32 (the same being those just above referred to) are keyed upon the shafts 17 and fit snugly within the bores of the side cylindrical portion 3 of the casing 1. The peripheries of the said abutments are adapted to roll against the periphery of the rotor 26 and the said abutments 32 are provided in their peripheries with recesses 33 which are adapted to register with and receive the wings 27 when the said wings enter the arcs of the bores through the said side portions 3 of the casing 1.

The operation of the engine is as follows: Presuming that steam or other fluid under pressure is admitted into the inlet ports 23 of the casing 1 the said steam or equivalent element passes into the passages 21 and from thence through the outlets 22 if the passages 28 are in register with the said outlets 22 into the opposite end portions of the rotor 26. If in starting the engine the ends of the passages 21 are not in register with the outlets 22 of the steam passages 21 it is necessary to rotate the shafts 14 until the outlets 22 of the said passages 21 are brought into register with the inner ends of the steam passages 28. From the steam passages 28 the steam passes through the passages 29 and as the peripheries of the abutments 32 are in contact with the periphery of the rotor 26 the expansion of the steam must be between the said abutments 32 and the wings 27. At the same time the steam under pressure will pass through the passages 30 and bear against the outer portions of the roller abutments 32 in the manner as hereinbefore described. Inasmuch as the wings 27 are subjected to the expansion of the steam the said wings will be rotated about the axis of the shaft 14 and the rotor 26 will be correspondingly rotated. When the wings pass beyond the inner ends of the outlet or exhaust port 24 the steam is permitted to escape from the interior of the cylindrical portion 2 of the casing 1 through the said exhaust port and at this time the roller abutments 32 have been turned sufficiently to bring their recesses 33 in such position that they will receive the outer end portions of the wings 27. At this time the inner ends of the steam passages 28 have passed beyond the ends of the arcuate steam outlets 22 of the passages 21 and consequently the steam is cut off, but the rotor 26 will continue to rotate under the momentum that it has gained until the inner ends of the steam passages 28 are again brought in register with the steam outlets 22 of the steam passages 21.

By reference to Fig. 3 of the drawing it will be seen that the gear wheels 16 are of relatively small diameter as compared with the gear wheel 15, the proportion being such that the gear wheels 16 describe two revolutions to one revolution of the gear wheel 15, and in this structure the diameter of the roller abutments 32 is small as compared with the diameter of the rotor 26, inasmuch as the abutments describe two rotations to every one rotation of the rotor and consequently the abutments are provided with one recess 33 only and the said recess is adapted to receive the wings 27 at the opposite sides of the rotor. In the form of the invention as illustrated in Fig. 4 of the drawing, the roller abutments are of the same diameter as the rotor 26 and therefore the roller abutments 32 are provided with recesses 33 at their opposite sides and it will be understood that the gear wheels which operate the roller abutments from the rotor shaft will be of the same diameter as the gear wheel upon the rotor shaft. If desired and as shown in Fig. 4 of the drawing the steam passages 30 may be provided with by-passes 34 which communicate with the upper and lower portions respectively of the bores through the side portions 3 of the casing 1 and further means for admitting steam to the peripheries of the roller abutments 32 to cushion the said abutments in their rotary movement within the bores of the side portions 3 of the casing. As illustrated in Fig. 3 of the drawing the castings 10 are provided with oil ducts 35 which are continued throughout the rotors 26 and the bearings 8 and further means for conveying oil from the gear chamber 13 to the movable parts of the abutment mechanism. So the casting 10 is provided with an oil duct 36 which is continued through the rotor 26 and the bearing 9 and is adapted to convey oil from the chamber 13 to the movable parts of the rotor mechanism.

Having described the invention what I claim as new and desire to secure by Letters Patent is:

1. A rotary engine comprising a casing having an inlet steam passage and an outlet steam passage, a rotor journaled within the casing and having at its opposite end portions steam passages adapted to register at times with the inlet steam passages in the casing, the steam passages of the rotor having their outlets located at diametrically opposite sides of the rotor, and roller abutments located within the casing and having recesses adapted to bear against the periphery of the rotor.

2. A rotary engine comprising a casing having a steam inlet passage with outlets at the opposite ends of the casing, said casing being also provided with steam outlets, a rotor journaled in the casing and having steam passages at its opposite ends which at times are adapted to register with the steam outlets of the steam inlet passages in the casing, the steam passages in the rotor having outlets at diametrically opposite sides of the rotor, wings carried upon the periphery of the rotor and roller abutments journaled within the casing, and adapted to bear at their peripheries against the periphery of the rotor, and provided in their peripheries with recesses adapted to receive the wings upon the rotor.

3. A rotary engine comprising a casing having steam inlet passages provided with outlets located at the opposite ends of the casing, a rotor journaled within the casing and having at its opposite ends steam passages, the inner ends of which at times are adapted to register with the outlet ends of the steam inlet passages in the casing, said rotor being provided upon its periphery with wings, the wings being located at opposite sides of the rotor, the steam passages in the ends of the rotor passing through said wings and having outlets at the sides of the wings, roller abutments journaled in the casing and adapted to bear at their peripheries against the periphery of the rotor, and having in their peripheries recesses adapted to receive the said wings during the rotation of the rotor.

4. A rotary engine comprising a casing having a steam inlet provided with outlets at the opposite ends of the casing, a rotor journaled in the casing and having steam passages at its opposite ends, the inlet ends of which at times are adapted to register with the steam outlet ends of the steam inlet passage, the steam outlets of the steam inlet passages describing arcs, wings mounted upon diametrically opposite sides of the rotor and through which the steam passages at the opposite ends of the rotor pass and discharge at the sides of the said wings, roller abutments journaled in the casing and having in their peripheries recesses adapted to receive the said wings as the rotor rotates.

In testimony that I claim the foregoing as my own, I have hereto affixed my signature in the presence of two witnesses.

CHARLES ANDREW BENDER.

Witnesses:
  Sara L. Swengel,
  A. W. Swengel.